United States Patent
Yang et al.

(10) Patent No.: US 10,460,869 B2
(45) Date of Patent: Oct. 29, 2019

(54) MULTI-SERIES CONTINUOUS-FLOW MAGNETOELECTRIC COUPLING PROCESSING SYSTEM AND APPLICATIONS THEREOF

(71) Applicant: Jiangnan University, Wuxi (CN)

(72) Inventors: Na Yang, Wuxi (CN); Xueming Xu, Wuxi (CN); Yamei Jin, Wuxi (CN); Fengfeng Wu, Wuxi (CN); Zhengyu Jin, Wuxi (CN); Xing Zhou, Wuxi (CN); Yaoqi Tian, Wuxi (CN); Aiquan Jiao, Wuxi (CN)

(73) Assignee: Jiangnan University, Wuxi (CN)

( * ) Notice: Subject to any disclaimer, the term of this patent is extended or adjusted under 35 U.S.C. 154(b) by 338 days.

(21) Appl. No.: 15/548,052

(22) PCT Filed: Jan. 21, 2016

(86) PCT No.: PCT/CN2016/071560
§ 371 (c)(1),
(2) Date: Aug. 1, 2017

(87) PCT Pub. No.: WO2017/045327
PCT Pub. Date: Mar. 23, 2017

(65) Prior Publication Data
US 2018/0033548 A1 Feb. 1, 2018

(30) Foreign Application Priority Data
Sep. 14, 2015 (CN) .......................... 2015 1 0583199

(51) Int. Cl.
*H01F 38/14* (2006.01)
*A23L 5/30* (2016.01)
(Continued)

(52) U.S. Cl.
CPC ................ *H01F 38/14* (2013.01); *A23L 5/30* (2016.08); *B01J 19/087* (2013.01); *H01F 1/34* (2013.01);
(Continued)

(58) Field of Classification Search
CPC ...... H01F 38/14; H01F 27/2876; H01F 27/24; H01F 1/34; H01F 7/20; H01F 1/057;
(Continued)

(56) References Cited

U.S. PATENT DOCUMENTS 4,488,962 A * 12/1984 Inoue ...................... H01F 13/00
210/138
9,782,742 B2 * 10/2017 Xu ........................ B01D 11/0419
(Continued)

FOREIGN PATENT DOCUMENTS

| CN | 103504454 A | 1/2014 |
| CN | 104427669 A | 3/2015 |

(Continued)

OTHER PUBLICATIONS

International Search Report of PCT/CN2016/071560, published on Jun. 17, 2016.

*Primary Examiner* — David C Mellon
(74) *Attorney, Agent, or Firm* — Wang Law Firm, Inc.

(57) ABSTRACT

The present invention discloses a multi-series continuous-flow magnetoelectric coupling processing system and applications thereof. The processing system comprises multi-series of induction units, a power supply and a feed liquid container, wherein each series of the induction unit comprises a closed iron core, a primary coil wound around one side of the closed iron core, and a secondary coil wound around the other side of the closed iron core and arranged in an induction cavity, the secondary coil comprises an insulation pipe for circulation of feed liquid, and the two ends of (Continued)

the insulation pipe are exposed from the induction cavity and are respectively acted as a feeding hole and a discharge hole; the power supply is in parallel connection with each primary coil in the induction unit and provides excitation voltage to each primary coil; and the feed liquid container is in series connection with the insulation pipes of the multi-series induction units to form a feed liquid circulation loop. According to the multi-series continuous-flow magnetoelectric coupling processing system and the applications thereof, operation parameters are abundant; no electrode directly contacts with the feed liquid, thereby avoiding ionic polarization, electrochemical reactions, and heavy metal contamination; besides, the multi-series continuous-flow magnetoelectric coupling processing system has advantage of high mass transfer efficiency.

10 Claims, 3 Drawing Sheets

(51) Int. Cl.
    *H01F 1/34*     (2006.01)
    *H01F 27/24*     (2006.01)
    *H01F 27/28*     (2006.01)
    *B01J 19/08*     (2006.01)

(52) U.S. Cl.
    CPC .......... *H01F 27/24* (2013.01); *H01F 27/2876* (2013.01); *A23V 2002/00* (2013.01); *B01J 2219/00051* (2013.01)

(58) Field of Classification Search
    CPC .... H01F 27/2823; H01F 7/064; H01F 7/0205; H01F 7/0294; A23L 5/30; A23L 3/22; A23L 3/32; A23L 3/325; A23L 2/50; A23V 2002/00; B01J 19/12; B01J 19/087; B01J 19/127; B01J 19/126; B01J 2219/0807; B01J 2219/0801; B01J 2219/00189; B01J 2219/00162; B01J 2219/00051; B01J 19/0046; B01J 19/0013; B01J 2219/0877; B01J 2219/0871; B01J 2219/0869; B01J 2219/0803; B01J 2219/00495; B01J 2219/0854; C12N 13/00; C12M 1/00; C12M 35/06; C12M 35/02; C12M 29/18; C12M 21/18; B01D 11/0211; B01D 11/0419; B01D 11/0207; A61L 2/26; A61L 2/03; A23J 3/00; A23J 3/04; A23F 3/16; H02P 31/00; C12P 19/04; C12P 19/02; C12P 7/62; C12P 7/58; B03C 1/00; B03C 1/025; B03C 1/031; B03C 1/033; B03C 1/0335; B03C 1/034; B03C 1/035; B03C 1/0355; B03C 1/23; B03C 1/24; B03C 1/32; B03C 2201/22
See application file for complete search history.

(56) References Cited

U.S. PATENT DOCUMENTS

| | | | |
|---|---|---|---|
| 10,322,396 B2 * | 6/2019 | Xu | ............................ B01J 19/12 |
| 2012/0295302 A1 * | 11/2012 | Lamish | ................. B03C 1/0335 |
| | | | 435/39 |
| 2017/0136437 A1 * | 5/2017 | Xu | ...................... B01D 11/0419 |
| 2019/0118153 A1 * | 4/2019 | Yang | ......................... A23F 3/16 |

FOREIGN PATENT DOCUMENTS

| | | | | |
|---|---|---|---|---|
| CN | 104722255 A | * | 6/2015 | ......... B01D 11/0419 |
| GB | 190322793 A | | 7/1904 | |

* cited by examiner

MULTI-SERIES CONTINUOUS-FLOW MAGNETOELECTRIC COUPLING PROCESSING SYSTEM AND APPLICATIONS THEREOF

TECHNICAL FIELD

The present invention particularly relates to a multi-series continuous-flow magnetoelectric coupling processing system using alternating induced electric fields and applications thereof, such as applications in the fields of food processing, biochemical reaction and the like.

BACKGROUND

An agro-food processing system is capable of providing suitable conditions for chemical and biological reactions, converting raw materials into specific products and improving their quality. Reaction systems can be widely applied to chemical, biological, food and pharmaceutical industries. And, the electric field is mainly applied in food, chemical and agricultural processing, which can achieve sterilization, inactivation of enzyme, and high-efficiency extraction of functional ingredients and enhancement of diffusion. The existing electrical processing technologies containing high-intensity pulsed electric field, moderate electric field and ohmic heating have the following control conditions: electric field intensity, processing duration, frequency, waveform, flow rate, temperature, electrode configuration and the like. However, these technologies utilize metal electrodes to process samples, resulting in electrochemical reactions, electrode corrosion, and heavy metal contamination during long-term treatment.

SUMMARY

In view of disadvantages in the prior art, a main objective of the present invention is to provide a multi-series continuous-flow magnetoelectric coupling processing system and applications thereof.
In order to achieve the objective described above, a technical scheme adopted by the present invention comprises:
in some embodiments, a multi-series continuous-flow magnetoelectric coupling processing system is provided, which comprises:
more than two series of induction units, wherein each series of the induction unit comprises: a closed iron core,
a primary coil, wound around one side of the closed iron core, and
a secondary coil, wound around the other side of the closed iron core and arranged in an induction cavity, wherein an insulation pipe comprises the coil support for allowing circulation of feed liquid, and the two ends of the insulation pipe are exposed from the induction cavity and are respectively acted as a feeding hole and a discharge hole;
a power supply, in connection with the primary coils of the more than two series of the induction units and providing excitation voltage for each primary coil;
and a feed liquid container, in series connection with the insulation pipes of the more than two series of the induction units to form a feed liquid circulation loop.
In some preferable embodiments, the power supply can yield sine waves or pulse waves in a frequency range of 20-200 kHz, wherein the voltage is 0-10 kV, the output power is 0-20 kW, and the pulse wave duty cycle is 5%-90%.

In some preferable embodiments, the closed iron cores are made from ferrite materials, and the operating frequency range of each closed iron core is 20-200 kHz.
In some preferable embodiments, the turn ratio of the primary coil to the secondary coil, both of which are wound around the same closed iron core, is (4:1-100:1) to (2-3). Furthermore, the materials of the primary coils are at least selected from, but not limited to, copper.
Preferably, the number of turns of each primary coil is 100-1000;
and furthermore, the material of each insulation pipe is at least selected from, but not limited to, a glass spiral tube.
Preferably, the number of turns of each secondary coil is 10-25.
In some preferable embodiments, the system further comprises a temperature-control unit for adjusting the temperature of the feed liquid.
Preferably, the temperature-control unit comprises constant-temperature jacketed layers for circulation of constant-temperature circulating solution, the constant-temperature jacketed layers are arranged in the induction cavities and cover the insulation pipes, and the constant-temperature jacketed layers are further communicated with a constant-temperature liquid circulating bath through constant-temperature liquid circulating bath inlets and constant-temperature liquid circulating bath outlets, which are distributed on the induction cavities.
Preferably, the temperature-control unit comprises a constant-temperature bath, and the feed liquid container is positioned in the constant-temperature bath.
Preferably, the temperature of the feed liquid in the circulation loop ranges from −20° C. to 130° C.
In some preferable embodiments, at least one constant-temperature liquid circulating bath and at least two constant-temperature jacketed layers are in series connection to form one constant-temperature circulation loop.
In some preferable embodiments, the length of each induction cavity is smaller than or equal to 500 mm.
In some preferable embodiments, the length of each silicone hose for communicating the two adjacent induction units is smaller than 20 cm.
In some preferable embodiments, the processing system further comprises a device for driving the feed liquid to circularly flow.
Preferably, the flow rate of the feed liquid in the loop system ranges from 50 mL/s to 500 mL/s.
Preferably, the actual power of the system is $P_0 \geq P_1 + P_2 + \ldots + P_n$, wherein the $P_0$ is the actual power of the power supply, the $P_1$ is the input power of a first series of the induction unit, the $P_2$ is the input power of a second series of the induction unit, and the $P_n$ is the input power of the n-th series of the induction unit; and $P_n = U_P \times I_P = (U_P/Z_P) \times U_P$, wherein the $U_P$ is the excitation voltage of the power supply, the $Z_P$ is the primary coil impedance of a single series of the induction unit at an operating frequency, the $I_P$ is the primary coil current of the single series of the induction unit, and the n is a maximum induction unit number of the processing system.
In some embodiments, applications of the multi-series continuous-flow magnetoelectric coupling processing system in high-efficiency hydrolyzation and/or modification of natural polymers, assisted extraction of natural products or quality improvement of liquid foods are provided.
Compared with the prior art, the multi-series continuous-flow magnetoelectric coupling processing system provided by the present invention has the advantages:

1. the multi-series continuous-flow magnetoelectric coupling processing system provided by the present invention has more abundant operation parameters, including excitation voltage strength, signal types, frequency, processing temperature and feed liquid flow rate; in particular due to a method that the alternating voltage induced in a feed liquid via magnetoelectric coupling, electrodes cannot be utilized, that is, no electrode directly contacts with the feed liquid, so that ionic polarization, electrochemical reactions, and heavy metal contamination can be avoided; and meanwhile, the multi-series continuous-flow magnetoelectric coupling processing system has the advantage of high efficiency of mass transfer; and 2. the multi-series continuous-flow magnetoelectric coupling processing system provided by the present invention has the advantages that operations are convenient and high efficiency.

Figure 1:
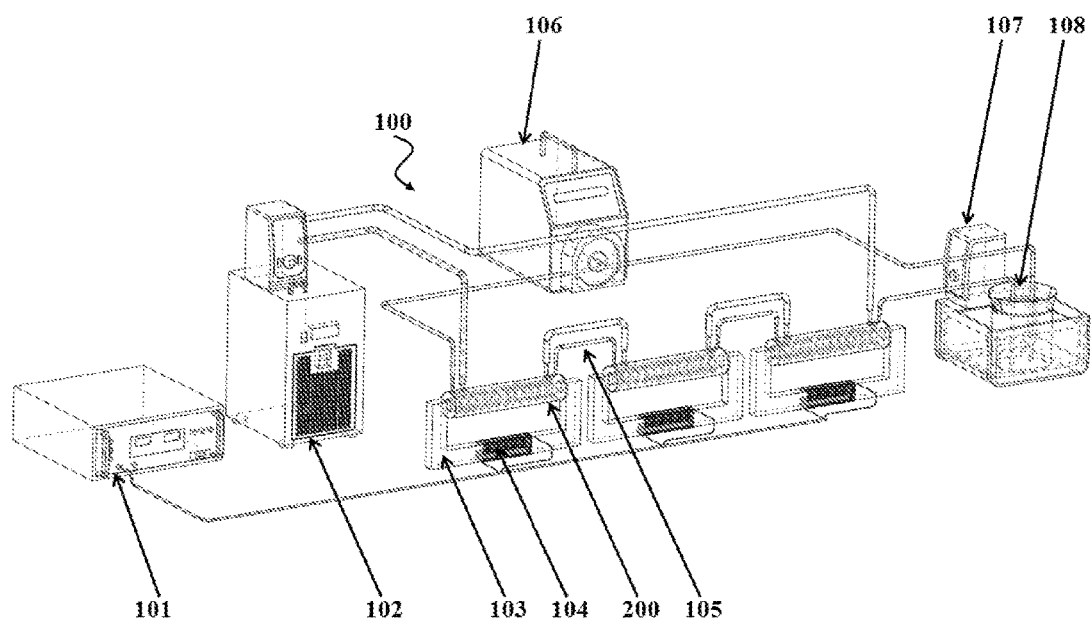
FIG. 1 is a structural schematic diagram of a multi-series continuous-flow magnetoelectric coupling processing system in a typical embodiment provided by the present invention.

In the drawings, numeric symbols are as follows: 100—processing system chain, 101—power supply, 102—constant-temperature liquid circulating bath, 103—closed iron core, 104—primary coil, 105—silicone hose, 106—pump, 107—constant-temperature bath, 108—feed liquid container, 200—induction cavity, 201—glass spiral tube, 202—constant-temperature jacketed layer, 203—feed liquid inlet, 204—feed liquid outlet, 205—constant-temperature liquid circulating bath inlet, 206—constant-temperature liquid circulating bath outlet, 300—induction unit, and 400—processing system equivalent circuit diagram.

DESCRIPTION OF EMBODIMENTS

In view of deficiencies of the prior art, the inventors of the present invention provide the technical scheme of the present invention based on long-term research and a lot of practices. The following further explains and describes the technical scheme, implementation processes and principles of the present invention.

On one aspect, the present invention relates to a multi-series continuous-flow magnetoelectric coupling processing system, which comprises:

more than two series of induction units, wherein each series of the induction unit comprises:

a closed iron core 103, a primary coil 104, wound around one side of the closed iron core 103, and a secondary coil, wound around the other side of the closed iron core 103 and arranged in an induction cavity 200, wherein an insulation pipe comprises the coil support for circulation of feed liquid, and the two ends of the insulation pipe are exposed from the induction cavity 200 and are respectively acted as a feeding hole and a discharge hole;

a power supply 101, in connection with the primary coils 104 of the more than two series of the induction units and providing excitation voltage for each primary coil 104;

and a feed liquid container 108, in series connection with the insulation pipes of the more than two series of the induction units to form a feed liquid circulation loop.

When the multi-series continuous-flow magnetoelectric coupling processing system works, continuous-flow feed liquid is acted as conductors of the transformer secondary coils, and the insulation pipes are utilized as supporting tubes. Excitation voltage generated by the power supply 101 excites the primary coils 104, and then alternating magnetic flux appears in the closed iron cores 103. Finally, alternating induced voltage generates in the feed liquid as the conductors of the secondary coils, and the feed liquid keeps circular flowing in a loop system for processing.

More specifically, the principle of the present invention is as follows:

a transformer belongs to an electric energy and magnetic energy conversion device and applies alternating excitation voltage $U_P$ to the primary coil (the number of turns of the primary coil is $N_P$) of a transformer, so that a magnetic flux generates in the iron core, wherein magnetic flux density is proportional to the number of turns of the coil; the electromagnetic induction obeys with the Ampere circuital theorem and relates the integrated magnetic field around a closed loop to the electric current passing through the loop. When the excitation voltage and the turn ratio of the primary coil to the secondary coil remain at a fixed level, the induced voltage is fixed at a constant level. Then, the induced voltage Es of a secondary circuit is applied on an external load and the secondary coil. If the feed liquid, including a lot of charged ions, charged compounds, polar molecules, charge-carrying protein and enzymes and the like, is utilized as the secondary coil, and then the alternating induced voltage exists in the circulatory feed liquid under alternating magnetic flux. Finally reaction kinetics and physicochemical properties of products are changed.

With reference to the FIG. 1 showing a structural schematic diagram of a multi-series continuous-flow magnetoelectric coupling processing system in a typical embodiment provided by the present invention, the multi-series continuous-flow magnetoelectric coupling processing system is mainly composed of a power supply 101, primary coils 104, closed iron cores 103, induction cavities 200, pipeline system, pump 106, temperature-control unit and the like.

In some embodiments, the power supply 101 can yield sine waves or pulse waves in a frequency range of 20-200 kHz, wherein the voltage is 0-10 kV, the output power is 0-20 kW, and the pulse wave duty cycle is 5%-90%; at the same time, the primary coils 104 on the closed iron cores are excited, thereby obtaining the alternating induced voltage in the system.

In some embodiments, the closed iron cores 103 are made from ferrite materials, and the operating frequency range of each closed iron core is 20-200 kHz.

In some embodiments, in the single induction cavity 200, an insulation pipe (preferably a glass spiral tube) is arranged, and is wound around one side of the ferrite core 103 to be acted as a supporting tube of a conductor; additionally, the two ends of the glass spiral tube are respectively guided out of the induction cavity 200 and are acted as a feeding hole 203 and a discharge hole 204 of the feed liquid, and the number of turns of the glass spiral tube is 10-25; a constant-temperature jacketed layer is arranged outside the glass spiral tube; a constant-temperature liquid circulating bath inlet 205 and a constant-temperature liquid circulating bath outlet 206 are located in the both ends of the induction cavity 200, and are used for circulating the solution of different temperatures to maintain the feed liquid temperature in the glass spiral tube, so that a function of temperature-control on the process is implemented.

Preferably, the length of the single induction cavity 200 is not greater than 500 mm.

In some embodiments, the primary coils 104 are copper coils, the number of turns of each primary coil wound around the closed iron core is 100-1000 turns, and each primary coil 104 and the power supply 101 are in parallel connection.

In some embodiments, a high-temperature and acid-alkali resistant polytetrafluoroethylene silicone hose 105 connects each series of the induction unit to form a series structure, that is, a discharge hole 204 on each induction cavity 200 is connected with a feeding hole 203 on the next induction cavity 200, and preferably, the length of the silicone hose needed for connection is smaller than 20 cm. At this time, each secondary coil is acted as a single 'source', and the total induced voltage applied to the circulatory feed liquid is the sum of the induced voltage of each series of the induction cavity 200.

In some embodiments, a delivery pump 106 can be arranged on the feed liquid circulating pipe and is connected with the feed liquid container 108 so as to achieve a purpose of driving the feed liquid to circularly flow, for example, the flow rate can be preferably selected from a range of 50 mL/s to 500 mL/s.

In some embodiments, according to processing temperature requirements, the feed liquid container 108 needs to be placed in a constant-temperature bath 107 to keep the required temperature.

In some embodiments, the temperature-control unit comprises a constant-temperature liquid circulating bath 102 and a constant-temperature bath 107, wherein an outlet and an inlet of the constant-temperature liquid circulating bath 102 are respectively communicated with the constant-temperature liquid circulating bath inlet 205 and the constant-temperature liquid circulating bath outlet 206 of the induction cavities 200 so as to maintain the processing temperature range from −20° C. to 130° C.; and each constant-temperature liquid circulating bath 102 is used for keeping the temperature of 1-3 induction cavities 200, the constant-temperature liquid circulating bath outlet 206 of each induction cavity 200 is connected with the constant-temperature liquid circulating bath inlet 205 on the next induction cavity 200.

The feed liquid circularly flows in multi-series supporting tubes and is acted as the conductors of the secondary coil, and meanwhile, the feed liquid is influenced by the induced voltage; the circulation time of the feed liquid is determined according to process requirements; and finally, a purpose of changing the reaction kinetics, physiochemical properties of products, and food quality are achieved.

The actual power of the power supply 101 ensures that each series of the induction unit works smoothly, namely $P_0 \geq P_1 + P_2 + \ldots + P_0$, wherein the $P_0$ is the actual power of the power supply, the $P_1$ is the input power of a first series of the induction unit, the $P_2$ is the input power of the second series of induction unit, and the $P_n$ is the input power of the n-th series of the induction unit; and $P_n = U_P \times I_P = (U_P/Z_P) \times U_P$, wherein the $U_P$ is the excitation voltage of the power supply, the $Z_P$ is the primary coil impedance of a single series of the induction unit at an operating frequency, the $I_P$ is the primary coil current of the single series of the induction unit, and the n is a maximum induction unit number of the processing system.

On the other aspect, the present invention further relates to applications of the multi-series continuous-flow magnetoelectric coupling processing system, and its application fields comprise: 1, high-efficiency hydrolyzation and modification of natural polymer; 2, assisted extraction of natural products; and 3, quality improvement of liquid foods.

During the applications, the processing time is decided by the characteristics of needed products.

Compared with the existing high-intensity pulsed electric field and moderate electric field technologies, as well as ohmic heating, the multi-series continuous-flow magnetoelectric coupling processing system provided by the present invention has advantages of the continuous-flow processing, utilization of induced voltage, and avoidance of heavy metal contaminationhuago, thereby achieving rapid and large-scale processing of the chemicals, food and agricultural byproducts.

The following further explains and describes the technical scheme, implementation processes and principles of the present invention in details through some embodiments.

Embodiment 1: High-Efficiency Acid Hydrolysis of Wheat Bran

The following further describes an application of the multi-series continuous-flow magnetoelectric coupling processing system in a hydrolyzation reaction of wheat bran for preparing reducing sugar.

Figure 4:
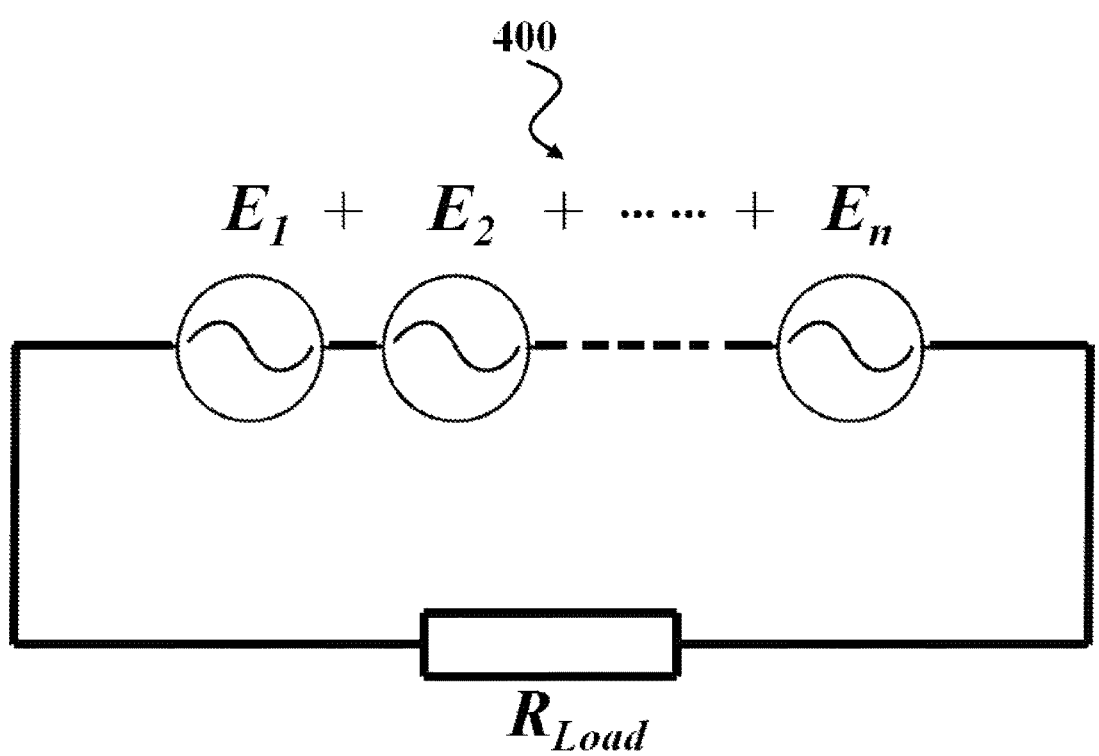
FIG. 4 is a schematic diagram of an equivalent circuit of a multi-series continuous-flow magnetoelectric coupling processing system in a typical embodiment provided by the present invention.

As shown in the FIG. 1 to the FIG. 4, in this embodiment, the present invention provides a multi-series continuous-flow magnetoelectric coupling processing system, which comprises a processing system chain 100, induction cavities 200, induction units 300, and a processing system equivalent circuit diagram 400.

Referring to the FIG. 1, the processing system chain 100 comprises a power supply 101, a constant-temperature liquid circulating bath 102, ferrite cores 103, primary coils 104, induction cavities 200, high-temperature and acid-alkali resistant polytetrafluoroethylene silicone hoses 105, a pump 106, a constant-temperature bath 107 and a feed liquid container 108.

Figure 2:
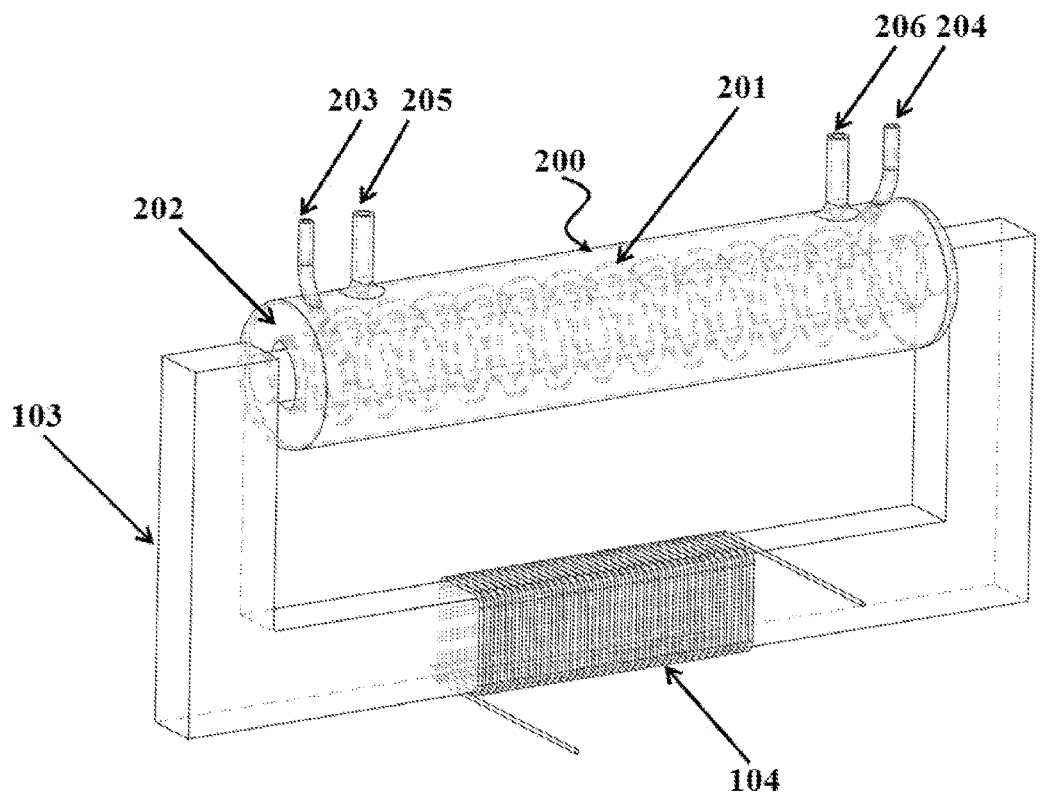
FIG. 2 is a structural schematic diagram of an induction cavity in a typical embodiment provided by the present invention.

An output terminal of the power supply 101 is communicated with the primary coils 104. The used power supply 101 can yield sine waves and pulse waves in the frequency of 20-200 kHz, wherein the voltage is 0-10 kV, the output power is 0-20 kW, and the pulse wave duty cycle is 5-90%; each primary coil 104 is a single-strand copper wire in the number of turns of 100-1000 and is wound around one side of the closed iron core 103; each closed iron core 103 is made from ferrite materials with the operating frequency range of 20-200 kHz and the actual power of 20 kW; the central circumference of each closed iron core is 850 mm, and the thickness thereof is 20 mm; the other side of the closed iron core 103 inserts in the induction cavity 200, thereby ensuring that a glass spiral tube 201 is wound around the closed iron core 103; the number of turns of each glass spiral tube 201 is 10-25, and the inner diameter of each glass spiral tube 201 is 4 mm. Referring to the FIG. 2, the induction cavity 200 comprises the glass spiral tube 201, the constant-temperature jacketed layer 202, a feeding hole 203, a discharge hole 204, a constant-temperature liquid circulating bath inlet 205, and a constant-temperature liquid circulating bath outlet 206, wherein the two ends of the glass spiral tube 201 are respectively located at the ends of the induction cavity 200 to be acted as the feeding hole 203 and the discharge hole 204 of the feed liquid; the constant-temperature jacketed layer 202 is arranged outside of the glass spiral tube 201, and the constant-temperature liquid circulating bath inlet 205 and the constant-temperature liquid circulating bath outlet 206 are located in the both ends of the induction cavity 200 and are used for circulating the solution of different temperatures to maintain the temperature of the feed liquid in the glass spiral tube 201; and the length of the single induction cavity is not great than 500 mm.

Figure 3:
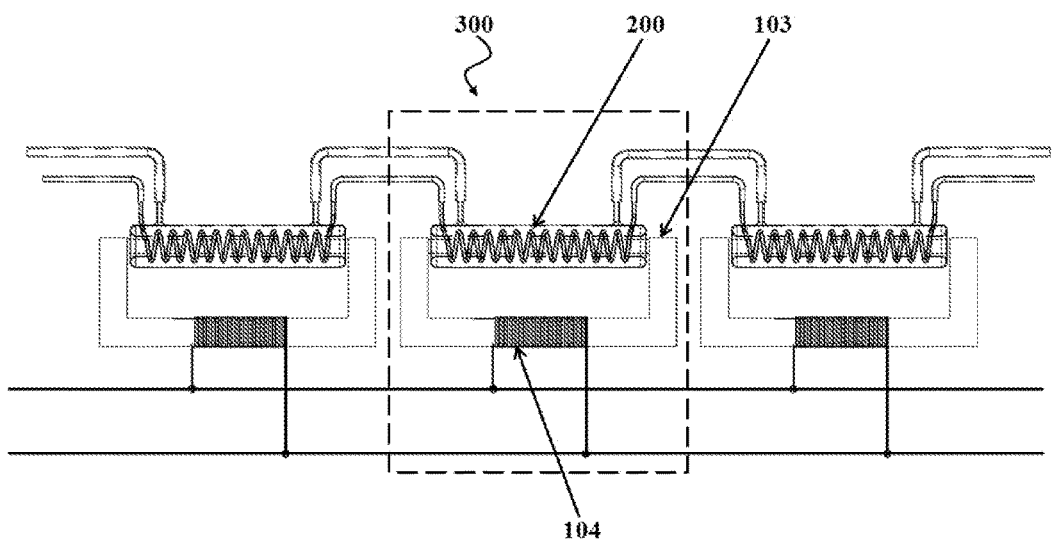
FIG. 3 is a structural schematic diagram of an induction unit in a typical embodiment provided by the present invention.

Referring to the FIG. 3, each series of the induction unit 300 comprises one induction cavity 200, one ferrite core 103 and one primary coil 104; the multi-series continuous-flow magnetoelectric coupling processing system at least comprises two series of the induction units, and each primary coil 104 and the power supply 101 are connected in parallel; high-temperature and acid-alkali resistant polytetrafluoroethylene silicone hoses 105 connects each series of the induction unit 300 to form a series structure, that is, the discharge hole 204 on each induction cavity 200 is connected with the feeding hole 203 on the next induction cavity; and the length of each silicone hose needed for connection is smaller than 20 cm, that is, each secondary coil is acted as a single 'source', which is $E_n$. An equivalent circuit of the system refers to the FIG. 4, wherein the total induced voltage applied to the circulatory feed liquid is the sum of the induced voltage of each secondary coil, namely $E_1+E_2+ \ldots +E_n$; the total impedance of the circulatory feed liquid is $Z_{load}$; furthermore, a pump 106 is arranged on the pipeline and is connected with the feed liquid container 108 so as to achieve a purpose of driving the feed liquid to circularly flow, wherein the flow rate ranges from 50 mL/s to 500 mL/s; and according to processing requirements, the feed liquid container 108 is placed in the constant-temperature bath 107 to maintain the required temperature.

Furthermore, it is important that each primary coil and the power supply are connected in parallel, and the actual power of the power supply can ensure that each series of the induction unit works smoothly, that is $P_0 \geq P_1+P_2+ \ldots +P_n$, wherein the $P_0$ is the actual power of the power supply, the $P_1$ is the input power of a first series of the induction unit, the $P_2$ is the input power of the second series of induction unit, and the $P_n$ is the input power of the n-th series of the induction unit; and $P_n=U_P \times I_P=(U_P/Z_P) \times U_P$, wherein the $U_P$ is the excitation voltage of the power supply, the $Z_P$ is the primary coil impedance of a single series of the induction unit at an operating frequency, the $I_P$ is the primary coil current of the single series of the induction unit, the n is a maximum induction unit number of the processing system, and the processing time depends on the physicochemical characteristics of the products.

The constant-temperature liquid circulating bath 102 is communicated with the constant-temperature liquid circulating bath inlet 205 and the constant-temperature liquid circulating bath outlet 206 respectively in the induction cavities 200 so as to maintain the processing temperature range from −20° C. to 130° C.; and each constant-temperature liquid circulating bath 102 is used for keeping the temperature of one to three induction cavities 200, the constant-temperature liquid circulating bath outlet 206 of each induction cavity 200 is connected with the constant-temperature liquid circulating bath inlet 205 on the next induction cavity 200.

By utilizing the multi-series continuous-flow magnetoelectric coupling processing system in the embodiment 1 to perform acid hydrolyzation of wheat bran for the production of reducing sugar for example, a proposed method using the system is further described. The method comprises the following steps:

Step 1: taking 1000 g of 60 meshes wheat bran into a 15 L container 108; adding 12 L distilled water; mixing and shaking the feed liquid; stirring the feed liquid for 20 min in the constant-temperature bath 107 of 60° C. for preheating; meanwhile, adding 1 L 0.5 mol/L hydrochloric acid solution into the feed liquid; and stirring the feed liquid again for 5 min;

Step 2: starting a peristaltic pump 106; pumping the feed liquid into the glass spiral tube 201 of all induction units for continuous flowing, wherein the flow rate is 100 mL/min, that is, the feed liquid flows into the feeding hole 203 on each induction cavity 200, and flows out from the discharge hole 204 on the induction cavity 200, then flows into the next induction cavity 200; starting the constant-temperature liquid circulating bath 102 and setting system temperature at 60° C., wherein the constant-temperature circulating solution flows into the constant-temperature liquid circulating bath inlet 205 on each induction cavity 200, and flows out from the constant-temperature liquid circulating bath outlet 206, and then flows into the next induction cavity 200; and in this embodiment, three induction units are utilized;

Step 3: starting the power supply 101, and selecting sine waves, wherein the frequency is 20 kHz, the excitation voltage is 2 kV and the actual power is 20 kW; meanwhile, exciting all primary coils 104, wherein the number of turns of the primary coil 104 is 100 turns, the impedance $Z_P$ of the primary coil is 1404 Ω at 20 kHz, the primary coil current $I_P$ is equal to 1.424 A, the input power of the single induction unit is $P_n=U_P \times I_P=2.849$ kW; the number of turns of the glass spiral tube 201, namely the secondary coil, is 20 turns, and the turns ratio of the primary coil to the secondary coil is 5:1; and according to ohm's law and its voltage distribution principle of the transformer, the induced voltage of the feed liquid in each glass spiral tube 201 is 400 V, and the three series of the induction units are utilized in the embodiment, that is, the total induced voltage is 1200 V, $P_0=20$ kW>$P_1+P_2+P_3=2.849$ kW+2.849 kW+2.849 kW=8.547 kW, so that the power supply 101 can ensure each induction unit to operate smoothly; and Step 4: stopping the system after 6 hours treatment, discharging the feed liquid, cooling the feed liquid to reach room temperature, then immediately adding $NaHCO_3$ solution with the mass fraction of 1% to adjust the pH of the feed liquid at 7, then stopping the reaction, and centrifuging the feed liquid at 5000 rpm for 20 min to remove sediments, thereby obtaining wheat bran hydrolysate including the reducing sugar.

Based on detection, the reducing sugar content of the obtained wheat bran hydrolysate via magnetoelectric coupling processing is 31.32%; compared with the control (0 V), the reducing sugar content of the obtained wheat bran hydrolysate is just 5.36%.

Embodiment 2: High-Efficiency Extraction of Pectin from Pineapple Peel Pomace

By utilizing the multi-series continuous-flow magnetoelectric coupling processing system in the embodiment 1 to perform extraction of natural products for example, a proposed method using the system is further described. The method comprises the following steps:

Step 1: taking 500 g of pineapple peel; pulping the pineapple peel; putting the pineapple peel pulp into a 10 L container 108; adding 8 L distilled water; mixing and shaking the feed liquid; stirring the feed liquid for 20 min in the constant-temperature bath 107 at 55° C. for preheating; Meanwhile, adding 1 L 0.1 mol/L hydrochloric acid solution into the feed liquid; and stirring the feed liquid again for 5 min;

Step 2: starting a peristaltic pump 106; pumping the feed liquid into the glass spiral tube 201 of all induction units for continuous flowing, wherein the flow rate is 50 mL/min, that is, the feed liquid flows into the feeding hole 203 of each induction cavity 200, and flows out from the discharge hole 204 on the induction cavity 200, then flows into the next induction cavity 200; starting the constant-temperature liquid circulating bath 102 and setting system temperature at 55° C., wherein the constant-temperature circulating solution flows into the constant-temperature liquid circulating bath inlet 205 on each induction cavity 200, and flows out from the constant-temperature liquid circulating bath outlet 206, then flows into the next induction cavity 200; in this embodiment, five induction units are utilized, and the two constant-temperature liquid circulating baths are used for keeping the temperature of the five induction cavities, one constant-temperature liquid circulating bath is connected with the three induction cavities, and the other constant-temperature liquid circulating bath is connected with the other two induction cavities;

Step 3: starting the power supply 101, and selecting sine waves, wherein the frequency is 50 kHz, the excitation voltage is 3 kV and the actual power is 50 kW; meanwhile, exciting all primary coils 104, wherein the number of turns of the primary coil 104 is 400 turns, the impedance $Z_P$ of the primary coil is 2504 $\Omega$ at 50 kHz, the primary coil current $I_P$ is equal to 1.198 A, the input power of the single induction unit is $P_0=U_P \times I_P=3.594$ kW; the number of turns of the glass spiral tube 201, namely the secondary coil, is 20 turns, and the turns ratio of the primary coil to the secondary coil is 20:1; and according to ohm' law and its voltage distribution principle, the induced voltage of the feed liquid in each glass spiral tube 201 is 150 V, and the five series of the induction units are utilized in the embodiment, that is, the total induced voltage is 750 V, $P_0=50$ kW$>P_1+P_2+P_3+P_4+P_5=3.594$ kW+3.594 kW+3.594 kW+3.594 kW+3.594 kW=17.970 kW, so that the power supply 101 can ensure each series of the induction unit 300 to operate smoothly; and Step 4: stopping the system after 1 hour treatment, discharging the feed liquid, cooling the feed liquid to reach room temperature, then immediately adding NaHCO$_3$ solution with the mass fraction of 1% to adjust the pH of the feed liquid at 7, then stopping the reaction, and centrifuging the feed liquid at 3000 rpm for 15 min to remove sediments, and drying the residual filtrate in an oven at 35° C. for 15 hours, thereby obtaining yellowish pectin powder.

Based on detection, the obtained pineapple peel pomace pectin mass via magnetoelectric coupling processing is 87.7 g, and compared with the control (0), the obtained pineapple peel pomace pectin mass is just 26.4 g.

Embodiment 3: Preparation of Corn Porous Starch

By utilizing the multi-series continuous-flow magneto-electric coupling processing system in the embodiment 1 to perform modification of carbohydrate polymers for example, a proposed method using the system is further described. The method comprises the following steps:

Step 1: taking 600 g of corn starch into a 15 L container 108; adding 10 L distilled water; mixing and shaking the feed liquid to obtain starch emulsion; adding 1.2 L 2 mol/L hydrochloric acid solution to adjust the pH of the starch emulsion at 3.7; and preheating and stirring at 40° C. for 5 min;

Step 2: starting a peristaltic pump 106; pumping the feed liquid into the glass spiral tube 201 of all induction units for continuous flowing, wherein the flow rate is 500 mL/min, that is, the feed liquid flows into the feeding hole 203 on each induction cavity 200, and flows out from the discharge hole 204 on the induction cavity 200, then flows into the next induction cavity 200; starting the constant-temperature liquid circulating bath 102 and setting system temperature at 62° C., wherein the constant-temperature circulating solution flows into the constant-temperature liquid circulating bath inlet 205 on each induction cavity 200, and flows out from the constant-temperature liquid circulating bath outlet 206, then flows into the next induction cavity 200; in this embodiment, nine series of the induction units are utilized, and three constant-temperature liquid circulating baths are used for keeping the temperature of the nine induction cavities, that is, each constant-temperature liquid circulating bath is connected with the three induction cavities;

Step 3: starting the power supply 101, and selecting pulse waves, wherein the duty cycle is 20%, the frequency is 180 kHz, the excitation voltage is 4 kV and the actual power is 20 kW; meanwhile, exciting all primary coils 104, wherein the number of turns of the primary coil 104 is 500 turns, the impedance $Z_P$ of the primary coil is 8504 $\Omega$ at 180 kHz, the primary coil current $I_P$ is equal to 0.470 A, the input power of the single series induction unit is $P_n=U_P \times I_P=1.880$ kW; the number of turns of the glass spiral tube 201, namely the secondary coil, is 25 turns, and the turns ratio of the primary coil to the secondary coil is 20:1; and according to ohm' law and its voltage distribution principle, the induced voltage of the feed liquid in each glass spiral tube 201 is 200 V, and the nine series of the induction units are utilized in the embodiment, that is, the total induced voltage is 1800 V, $P_0=20$ kW$>P_1+P_2+$ . . . $P_9=1.880$ kW+1.880 kW+ . . . +1.880 kW=16.920 kW, so that the power supply 101 can ensure each induction unit 300 to operate smoothly; and Step 4: stopping the system after 4 hours treatment, discharging the feed liquid, cooling the feed liquid to reach room temperature, immediately adding NaHCO$_3$ solution with the mass fraction of 2% to adjust the pH of the feed liquid at 7 then stopping the reaction, centrifuging the feed liquid at 3000 rpm for 15 min to obtain sediments, drying the sediments in an oven at 55° C. for 3 hours, smashing the sediments to pass through a 200 meshes screen, thereby obtaining modified porous corn starch. Based on detection, the oil absorptivity of the obtained porous corn starch via magnetoelectric coupling processing is 154.6%, and compared with the control (0 V), the oil absorptivity of the obtained porous corn starch is just 66.4%.

Embodiment 4: Sterilization and Inactivation of Enzyme in Orange Juice

By utilizing the multi-series continuous-flow magneto-electric coupling processing system in the embodiment 1 to perform quality improvement of liquid foods for example, a proposed method using the system is further described. The method comprises the following steps:

Step 1: taking 12 L fresh orange juice into a 15 L container 108; and stirring the orange juice for 20 min in the constant-temperature bath 107 at 10° C.;

Step 2: starting a peristaltic pump 106; pumping the feed liquid into the glass spiral tubes 201 of all induction units for continuous flowing, wherein the flow rate is 100 µL/s, that is, the feed liquid flows into the feeding hole 203 on each induction cavity 200, and flows out from the discharge hole 204 on the induction cavity 200, then flows into the next induction cavity 200; starting the constant-temperature liquid circulating bath 102 and setting system temperature at 10° C., wherein the constant-temperature circulating solution flows into the constant-temperature liquid circulating bath inlet 205 on each induction cavity 200, and flows out from the constant-temperature liquid circulating bath outlet 206, then flows into the next induction cavity 200; in this embodiment, 27 series of the induction units are utilized, and the nine constant-temperature liquid circulating baths are used for keeping the temperature of the 27 induction cavities, that is, each constant-temperature liquid circulating bath is connected with the three induction cavities 200;

Step 3: starting the power supply 101, and selecting pulse waves, wherein the duty cycle is 50%, the frequency is 200 kHz, the excitation voltage is 3 kV and the actual power is 20 kW; meanwhile, exciting the primary coils 104, wherein the number of turns of the primary coil 104 is 900 turns, the impedance $Z_P$ of the primary coil is 12564Ω at 180 kHz, the primary coil current $I_P$ is equal to 0.239 A, the input power of the single series induction unit is $P_n=U_P \times I_P=0.717$ kW; the number of turns of the glass spiral tube 201, namely the secondary coil, is 25 turns, and the turns ratio of the primary coil to the secondary coil is 36:1; and according to ohm' law and its voltage distribution principle, the induced voltage of the feed liquid in each glass spiral tube 201 is 83.3 V, and the 27 series of the induction units are utilized in the embodiment, that is, the total induced voltage is 2249.1 V, $P_0=20$ kW$>P_1+P_2+$ . . . $+P_{27}=0.717$ kW+ 0.717 kW+ . . . +0.717 kW=19.359 kW, so that the power supply 101 can ensure each induction unit to operate smoothly; and Step 4: stopping the system after 3 hours treatment, discharging the feed liquid, immediately testing the total number of bacterial colonies and the enzyme activity of peroxidase, and polyphenol oxidase, contrasting with the fresh orange juice, and extracting a portion of the orange juice to preserve at 5° C. for 7 days, and then determining the browning index.

Based on detection, the total number of bacterial colonies of the obtained orange juice via magnetoelectric coupling processing is $8.3 \times 10^4$ cfu/mL, the enzyme activity of the polyphenol oxidase is 16 unit/g/min, and the enzyme activity of the peroxidase is 35 unit/g/min; and compared with the control (0 V), the total number of bacterial colonies of the fresh orange juice is $4.3 \times 10^6$ cfu/mL, the enzyme activity of the polyphenol oxidase is 40 unit/g/min, and the enzyme activity of the peroxidase is 116 unit/g/min; furthermore, the browning index of the fresh orange juice after preserved at 5° C. for 7 days is 0.23, and the browning index of the orange juice processed via magnetoelectric coupling after preserved at 5° C. for 7 days is 0.11. The determination methods for the enzyme activity of the polyphenol oxidase, the enzyme activity of the peroxidase and the browning index refer to documents Do-Hee, Kim., Han-Bit, Kim., Hun-Sik, Chung., Kwang-Deog, Moon. (2014). Browning control of fresh-cut lettuce by phytoncide treatment. Food Chemistry, 159, 188-192.

It should be illustrated that all the accompanying drawings of the embodiments use a very simple form and use a non-accurate ratio, which are merely used to conveniently and clearly aid in illustrating the embodiments of the present invention.

It should be understood that the embodiments merely illustrate technical conceptions and features of the present invention, which aims at enabling persons familiar with this technology to understand and implement the content of the present invention, but not intend to limit the protection scope of the present invention. Equivalent changes or modifications made according to the spiritual substance of the present invention should fall within the protection scope of the present invention.

What is claimed is:

1. A multi-series continuous-flow magnetoelectric coupling processing system, comprising:
    more than two stages of induction units, wherein each stage of the induction unit comprises:
        a closed iron core,
        a primary coil, wound around one side of the closed iron core, and
        a secondary coil, wound around an opposite side of the closed iron core and arranged in an induction voltage chamber, wherein the secondary coil comprises an insulation pipe for circulation of a feed liquid, and two ends of the insulation pipe are exposed from the induction voltage chamber and respectively act as a feeding hole and a discharge hole;
    a high frequency power supply, in connection with the primary coils of the more than two stages of the induction units and providing excitation voltage for each of the primary coils; and
    a feed liquid container, in series connection with the insulation pipes of the more than two stages of the induction units to form a feed liquid circulation loop.

2. The system of claim 1, wherein the power supply can yield sine waves or pulse waves in a frequency range of 20-200 kHz, a signal voltage up to 10 kV, an output power up to 20 kW, and a pulse wave duty cycle of 5%-90%.

3. The system of claim 1, wherein each of the closed iron cores comprises ferrite materials and each of the primary coils has an operating frequency of 20-200 kHz.

4. The system of claim 1, wherein a turn ratio of the primary coil to the secondary coil, both of which are wound around the closed iron core, is 10-100 to 2-3;
    the primary coil comprises copper, and a number of turns of each primary coil is 100-1000; and
    each insulation pipe comprises a glass spring, and a number of turns of each secondary coil is 20-30.

5. The system of claim 1, further comprising a temperature-control unit for adjusting a temperature of a feed liquid;
    wherein the temperature-control unit comprises constant-temperature jacketed layers for circulation of a constant-temperature circulating solution, the constant-temperature jacketed layers are arranged in the induction voltage chamber covering the insulation pipes and in fluid communication with a constant-temperature liquid circulating bath through constant-temperature liquid circulating bath inlets and constant-temperature liquid circulating bath outlets, which are distributed on the induction voltage chamber;
    and/or the temperature-control unit comprises a constant-temperature bath, and the feed liquid container is positioned in the constant-temperature bath; and
    the temperature of the feed liquid in the circulation loop ranges from −20° C. to 130° C.

6. The system of claim 5, wherein at least one constant-temperature liquid circulating bath and at least two constant-temperature jacketed layers are in series connection to form one constant-temperature circulation loop.

7. The system of claim 1, wherein the length of each induction cavity is smaller than or equal to 500 mm;
    and/or wherein the system further comprises silicone hose for connecting two adjacent induction units of the more than two stages of induction units and the length of the silicone hose is less than 20 cm.

8. The system of claim 1, further comprising a device for driving the feed liquid to circulate in the circulation loop and the flow rate of the feed liquid in the circulation loop ranges from 50 mL/s to 500 mL/s.

9. The system of claim 1, wherein the rated power of the high frequency power supply is $P_0 \geq P_1 + P_2 + \ldots + P_n$, wherein $P_1$ is the input power of a first stage of the induction unit, $P_2$ is the input power of a second stage of the induction unit, and $P_n$ is the input power of an n-th stage of the induction unit; and $P_n = U_P \times I_P = (U_P/Z_P)\lambda U_P$, wherein $U_P$ is the input voltage of the power supply, $Z_P$ is the impedance of the primary coil of an individual stage of the induction unit at operating frequency, $I_P$ is the current of the single stage primary coil, and n is a total number of induction units of the processing system.

10. A method of using the system of claim 1 in processing a liquid mixture, the method comprising, mixing the liquid mixture with the system of claim 1, wherein the liquid mixture comprises natural polymers, natural products, or liquid foods.

* * * * *